United States Patent Office 3,542,717
Patented Nov. 24, 1970

3,542,717
ADHESIVE COMPOSITIONS CONTAINING CO-
POLYMERS OF ALPHA OLEFINS HAVING 11–20
CARBON ATOMS AND 4–20 CARBON ATOMS
AND LAMINATES FORMED THEREFROM
Roger D. A. Lipman, Yonkers, N.Y., assignor to Geigy
Chemical Corporation, Ardsley, N.Y., a corporation of
New York
No Drawing. Continuation-in-part of application Ser. No.
621,441, Mar. 8, 1967. This application Apr. 24, 1968,
Ser. No. 723,872
Int. Cl. C09j 3/26
U.S. Cl. 260—27     8 Claims

ABSTRACT OF THE DISCLOSURE

Adhesive compositions containing copolymers of alpha olefins having (a) 11–20 carbon atoms and (b) 4–20 carbon atoms per molecule are used to form laminates with various substrates. The adhesive is usually a liquid composition which can be made by dissolving suitable copolymers in organic solvents, preferably hydrocarbon solvents and can be compounded with tackifying resins, e.g., glycerol ester of hydrogenated rosin.

This application is a continuation-in-part of my copending application Ser. No. 621,441, filed Mar. 8, 1967, now abandoned.

This invention relates to new adhesive compositions and to laminated structures bonded by such compositions.

The history of adhesives is ancient indeed. For thousands of years, glues of various types have been made from natural materials such as white of eggs, excreta, blood, natural resins and bitumens. With the growth of modern chemistry synthetic resins such as phenol and ureaformaldehyde and more recently synthetic rubbers have formed the basis for adhesives.

Polyolefins, as a class, have been used to a limited extent in adhesives. Polyethylene, propylene-ethylene and propylene-butene copolymers have formed the basis for adhesives of various types but in general such adhesives have required extensive additions of other components such as tackifiers to yield successful products. Such compounding increases the cost of the adhesive.

It has now been found that certain alpha olefin copolymers containing a relatively large proportion of olefins having a relatively high molecular weight possess excellent adhesive properties, equal to or exceeding the properties of more complex blends of materials. The polymers in question can be applied to substrates as solutions with various common organic solvents, and, depending on the nature of the specific polymer, can be bonded dry, wet or while in a molten or semi-molten state.

In one aspect the invention therefore comprises an adhesive composition comprising an organic solvent containing a copolymer of at least one alpha olefin having between about 11 and about 20 carbon atoms and at least one other alpha olefin having between about 4 and about 20 carbon atoms in the molecule, said higher alpha olefins comprising at least 5% by weight of the copolymer, and preferably at least 10% by weight of the copolymer.

The compositions may be used to bond various substrates including cellulosic materials such as wood or paper, glass and metal.

The invention therefore further comprises a laminated product comprising a first substrate bonded to a second substrate by means of an intermediate layer comprising a copolymer of the class described.

The copolymers used in the present invention are, as noted above, copolymers of at least one alpha olefin having 11 to 20 carbon atoms and at least one alpha olefin having 4 to 20 carbon atoms, at least 5% and preferably at least 10% by weight of the copolymer being residues of alpha olefins having 11 to 20 carbon atoms. The copolymers will normally have an intrinsic viscosity in cyclohexane at 25° C. of between about 0.1 and about 10 dl./g.* They are generally of low crystallinity, say 0 to 5 percent, as measured by X-ray techniques. In physical appearance, they range from tacky, sticky, semi-solids, to waxy materials, the adhesive properties of which are not apparent from mere physical inspection. The copolymers are, generally speaking, soluble to a high degree in various common solvents, such as cyclohexane and n-heptane.

Copolymers of the type described may be made by flow or batch processes. In a simple batch process the mixture of monomers in question is simply charged to a reaction vessel with a suitable catalyst, normally in the presence of an inert organic diluent at appropriate temperatures and allowed to polymerize. After a suitable time the polymer, catalyst residue, diluent and unreacted monomer are removed, the catalyst is deactivated and the various components are separated by extraction or distillation or both.

Alternatively, the continuous processes described in Cobbs et al., application Ser. Nos. 580,973, 580,974 and 581,053, filed Sept. 21, 1966, as continuations-in-part of application Ser. Nos. 479,415 and 479,416, filed Aug. 13, 1965, may be employed. Applications Ser. Nos. 479,415 and 479,416 are now abandoned. In these processes reaction conditions which are substantially constant with time are maintained.

The monomers used in the process may be any of those within the ranges defined. Mixtures of monomers, e.g. $C_{11}$–$C_{14}$, $C_{14}$–$C_{18}$, $C_{15}$–$C_{18}$ and the like, are currently available on the open market and these may be used very satisfactorily. Indeed, such mixtures may constitute the sole monomer source. It is preferred, however, that the monomer mixture include in substantial proportions a lower alpha olefin having say 4 to 10 carbon atoms. Particularly preferred copolymers are made from butene-1 and mixtures of $C_{11}$–$C_{14}$ and $C_{14}$–$C_{18}$ monomers.

Some of the commercial olefin mixtures referred to above may contain minor amounts (usually less than 5%) of diolefins. For most purposes this has no effect. However where resistance to oxidation is required it is preferred to use diolefin free monomer mixtures.

The catalysts used in making the copolymers in question may be any of those commonly referred to as "low pressure" catalysts. These include, for example, chromium oxide or mixtures of chromium oxide and strontium oxide supported on a silica, alumina, silica-alumina, zirconia or thoria bed [1]; nickel or cobalt supported on charcoal [2]; and molybdenum oxide supported on alumina [3].

The S.N.A.M. catalysts based on a transition metal halide with A1HXY where X and Y may, for example, be hydrogen, halogen or a secondary amine radical, and the three component catalysts taught by D'Alelio may also be employed [4]. Of particular interest are the so-called Ziegler or Ziegler-Natta catalysts.

As is well known, Ziegler catalyst are prepared from two components, the first of which is an organometallic compound or a metal hydride in which the metal is chosen ---
\* Intrinsic viscosities given here and elsewhere in this specification are in deciliters per gram.
[1] See U.S. Pat. No. 2,825,721.
[2] See U.S. Pats. Nos. 2,658,059; 2,692,261; 2,692,295; 2,717,888 and 2,717,889.
[3] See U.S. Pats. Nos. 2,692,257; 2,692,258 and 2,780,617.
[4] See U.S. Pats. Nos. 3,240,770; 3,242,156; 3,245,976 and 3,229,024.

from Groups I and III of the Periodic Chart of the Elements[5]. Examples of such compounds are triethyl-aluminum, tri-isobutyl aluminum, tri-n-propyl aluminum, diethyl aluminum chloride, diethyl aluminum hydride diethyl-beryllium, phenyl lithium, and lithium hydride. The preferred compounds are diethyl aluminum chloride and triethyl aluminum.

The second component of the Ziegler catalyst is a compound of a metal of Groups IV–B to VI–B and VIII of the Periodic Chart of the Elements, preferably a compound of a metal of Groups IV–B to VI–B. Halides or oxyhalides are advantageously employed. Examples of suitable compounds include vanadium tetrachloride, vanadium trichloride, vanadyl trichloride, titanium tetrachloride, titanium trichloride, titanium tetrafluoride and tungsten hexachloride. Titanium trichloride is generally preferred.

The molecular ratio of the organo-metallic compound (the first component) to the metal compound (the second component) in the Ziegler catalyst may vary widely, from say 0.1 to 10 or more. The ratio is not critical, but for economy, ratios of say 1 to 5 are preferred.

The proportion of catalyst to monomer is again not a critical factor. Indeed since the role of the composition in question is that of a catalyst or initiator, any proportion can be used though, of course, excessively small proportions will give low conversions and to use excessive amounts is wasteful. Usually 0.0001 to 0.01 mol of catalyst per mol of olefin is used, based on the organo-metallic (first) component, in the case of a Ziegler catalyst.

Ziegler catalysts can be made more active by pretreating them with an alpha olefin having 4 to 20 carbon atoms, such, for example, as octene-1, prior to the copolymerization process. Such preactivation is normally carried out at 25 to 60° C. in the absence of air, for say 4 to 10 hours.

The process is normally carried out in the presence of a liquid diluent. The diluent may be any organic solvent inert to the monomers and catalyst components. Aliphatic paraffinic hydrocarbons, cycloparaffins or aromatic hydrocarbons may be used. The preferred diluent is cyclohexane.

In carrying out the process using a Ziegler catalyst, the two components of the catalyst are added to the diluent. Usually the first component, e.g., $Al(Et)_2Cl$, is added to the diluent followed by the second component, e.g., $TiCl_3$, to form a slurry. The reverse order may be followed, however, if desired.

The monomers, diluent and catalyst slurry are all introduced, in the absence of air, into a reaction zone, which is normally in a pressure vessel equipped with suitable temperature control, i.e., heating or cooling equipment.

The precise reaction conditions maintained in the reaction zone will be governed by the character of the monomer feed and by the qualities desired in the product. Moreover, the temperature, pressure and contact time will be interrelated.

Broadly speaking, the reaction temperature will range from about 20° C. to about 200° C. Pressure will be from about 0 p.s.i.g. to about 3000 p.s.i.g. For any given conditions of temperature and pressure, the reaction time should be such as to give a conversion of monomers between about 10 and about 100%, normally between about 50 and about 100%.

The adhesive properties of the copolymers may be put to use in various ways. As a first step, however, it is usually convenient to prepare a liquid composition which can be applied to substrates with comparative ease. This can be done by dissolving or suspending the copolymers in various suitable organic solvents. The solvent should be chosen so that it can be removed without difficulty by evaporation after the composition has been applied. While this will vary depending upon the conditions of use, broadly speaking, the solvent should have a boiling point of 35 to 150° C. Hydrocarbon solvents are prefered because of their compatibility with the polymers; however, other solvents such as halogenated hydrocarbons, ethers or esters may be used.

The concentration of the copolymer in the solvent will depend on the nature of the copolymer and of the solvent and on the degree of fluidity required. For most purposes, concentrations of 5 to 50% by weight will be found appropriate.

In using the novel compositions, they may be applied to the substrates to be joined to give a deposition of say 5 to 50 mg. polymer/in.[2] of substrate, the deposition depending on the particular polymer and on the substrate. The coating may be applied to one substrate or to both, but preferably to both. It may be allowed to dry before the two substrates are joined, or may be joined whilst still wet. Light pressure is preferably used, say 0.1 to 5 p.s.i.

The copolymers of the instant invention, when compounded with tackifying resins, such, for example, as the glycerol ester of an hydrogenated rosin, give compositions exhibiting good pressure sensitive tack. For such uses the proportion of tackifying resin should be from about 15% to about 80%, preferably from about 25 to about 75% by weight based on total solids.

Certain of the compositions may be used in melt adhesive techniques. In such cases, the polymer solution is applied to the substrates which are then heated to evaporate the solvent and to melt the residual polymer. Once the polymer is molten the coated substrates are pressed together and the laminated product is allowed to cool.

The invention will be described further by reference to the following specific examples.

EXAMPLE 1

In this run, 86.7 g. of monomer A, a commercial alpha olefin mixture containing, by weight:

|  | Percent |
|---|---|
| $C_{11}$ | 24.3 |
| $C_{12}$ | 24.2 |
| $C_{13}$ | 25.2 |
| $C_{14}$ | 26.3 |
|  | [1]100 | and 33.3 g. of monomer B, a commercial alpha olefin mixture containing, by weight:

|  |  |
|---|---|
| $C_{15}$ | 27.5 |
| $C_{16}$ | 29.5 |
| $C_{17}$ | 28.5 |
| $C_{18}$ | 14.5 |
|  | [2]100 |

[1] The above proportions include approximately 4% diolefin, 3% internal monoolefins and 1% saturates of $C_{11}$–$C_{14}$ chain length.

[2] The above proportions include about 7% internal monoolefin, about 2% diolefin and about 2% saturates of $C_{15}$–$C_{18}$ chain length.

were charged to a 1 gal. autoclave to which was also charged a slurry of 2 g. $TiCl_3 \cdot 1/3 AlCl_3$ and 2.6 ml. $Et_2AlCl$ in 2 l. of cyclohexane. The temperature of the clave was brought to 55° C. and maintained there for 20 hours. After that time, the catalyst was deactivated with methanol and filtered off. The solvents were distilled off and the polymer recovered in a yield of 62.0%. It was a tacky, very sticky, semi-solid having an intrinsic viscosity of 1.97 dl./g. For purposes of identification, this polymer is referred to below as polymer A.

EXAMPLE 2

The procedure of Example 1 was followed except that 99.7 g. of monomer A and 16 g. of monomer B were

[5] The version set out at pages 448–9 of the Handbook of Chemistry and Physics, 43rd edition, 1961–2, published by the Chemical Rubber Publishing Co. is referred to.

used and the reaction was carried out at 53° C. to 18% yield. The polymer was again very tacky but had an intrinsic viscosity of 2.52 dl./g. This polymer is referred to below as polymer B.

EXAMPLE 3

The procedure of Example 1 was repeated using a monomer feed consisting of 169 g. butene-1, 45.5 g. of monomer A and 14.1 g. of monomer C, a commercial alpha olefin mixture containing by weight:

| | Percent |
|---|---|
| $C_{14}$ | 41.5 |
| $C_{16}$ | 35.5 |
| $C_{18}$ | 24.0 |
| | 100[1] |

[1] The above proportions include about 8.5% internal monoolefins and less than 1.5% saturates of $C_{14}$-$C_{18}$ chain length.

The catalyst consisted of 4 g. $TiCl_3 \cdot \frac{1}{3} AlCl_3$ and 5.2 ml. $Et_2AlCl$ in 2 l. cyclohexane. The polymerization temperature was 78° C. and the yield was 162 g. The polymer was a waxy, non-tacky solid containing 13.3% by weight residues of $C_{11}$ and higher olefins. It had a molecular weight of about 600,000, a melting point of about 65° C. and a glass transition point of about −36° C. This polymer is referred to below as polymer C.

EXAMPLE 4

The procedure of Example 1 was repeated using 100.2 g. of monomer mixture C. Polymerization temperature was 55° C. and yield 71.2%. The polymer had an intrinsic viscosity of 1.60 dl./g. It was of waxy texture with a melting point of 58° C. It was designated polymer D.

EXAMPLE 5

The procedure of Example 1 was repeated using 60.4 monomer A and 59.6 g. monomer B. The catalyst consisted of 4 g. $TiCl_3$ and 5.2 ml. $Et_2AlCl$ in 2 l. cyclohexane. Polymerization temperature was 25° C. and the reaction was carried to 48% conversion. The polymer had an intrinsic viscosity of 4.03 dl./g. It was designated Polymer E.

EXAMPLE 6

The procedure of Example 1 was repeated using 86.7 g. monomer A and 33.5 g. monomer B. The catalyst was 2 g. $TiCl_3$ and 2.6 ml. $Et_2AlCl$ in 2 l. cyclohexane. Polymerization temperature was 25° C. and the reaction was carried to 70% conversion. The polymer had an intrinsic viscosity of 3.60 dl./g. It was designated polymer F.

EXAMPLE 7

Polymers A and B were made up into cyclohexane solutions containing 20 g. polymer in 100 ml. of cyclohexane. These solutions were then applied ot paper and wood substrates using a No. 40 film applicator bar. The strength of the bond was measured by several different tests. Approximately 10 mg./in.$^2$ of polymer was applied except as otherwise stated. The results are given below:

EXAMPLE 8

In these runs, 20% solutions in cyclohexane of polymers A, C and D were applied to one of the two bond paper substrates either by placing a single drop of the solution on the substrate and bringing the substrates into contact immediately, or by spreading the drop over one substrate and allowing it to become almost dry before bringing the other substrate into contact. In both cases, the samples were allowed to cure overnight (about 20 hours) under a pressure of about 0.25 p.s.i. They were tested using an Instron tester 24 hours after cure. The results are tabulated below:

| | Polymer | | |
|---|---|---|---|
| | A | B | D |
| | Bond strength (lbs.) | | |
| Peel test (paper joined wet) | 0.05 | 0.74 | 0.32 |
| Peel test (paper joined almost dry) | 0.84 | 0.89 | 0.08 |
| Overlapping test (paper joined while wet) | 1.2 | 22.9 | 17.0 |
| Overlapping test (paper joined almost dry) | 6.3 | 19.3 | 3. |

EXAMPLE 9

In these runs, the 20% cyclohexane solutions were applied to glass microscope slides, only one of the substrates being coated. In some cases, the substrates were bonded while the adhesives were still wet. In others, the adhesive was allowed to dry, and bond strength was measured.

The results are given below:

| | Polymer | | | |
|---|---|---|---|---|
| | A | C | D | E |
| | Bond strength (lbs.) | | | |
| Substrates joined while wet | 2.5 | 12.7 | 2.6 | 13.2 |
| Substrates joined after drying | 1.0 | 3.1 | 0 | 0.6 |

EXAMPLE 10

Example 9 was repeated using steel strips instead of glass. The results are given below:

| | Polymer | | | |
|---|---|---|---|---|
| | A | C | D | E |
| | Bond strength (lbs.) | | | |
| Substrates joined while wet | 1.4 | 1.2 | 4.2 | 0.7 |

EXAMPLE 11

Example 9 was repeated using wood strips as the substrate. The results are as follows:

| | Polymer | | | |
|---|---|---|---|---|
| | A | C | D | E |
| | Bond strength (lbs.) | | | |
| Substrates joined while wet | 0 | 25.6 | 23.6 | 0 |
| Substrates joined after drying | 0 | 0.7 | 14.6 | 0 |

| I.—Substrate: Bond Paper | | | | | II.—Substrate: Wood | |
|---|---|---|---|---|---|---|
| A.—Separation by peeling | | | B.—Separation by pulling lengthwise, i.e., parallel to the surface bonded | | | |
| | Force to separate (lbs.) | | | Force to separate (lbs.) | | Force to separate (lbs.) |
| Method of bonding | Polymer A | Polymer B | Method of bonding | Polymer A | Method of bonding | Polymer A |
| Both substrates coated, bonded dry. | 1.34 | 0.81 | Bonded dry (applied to both surfaces). | 3.52 | Bonded dry (one side) | 8.3 |
| Both sides coated, bonded wet. | 0.63 | | Bonded dry (applied to one surface). | 4.31 | Bonded dry (both sides) | 16.1 |
| Both sides coated, bonded dry (using 20 mg./in.$^2$). | 1.63 | 2.15 | Bonded dry (applied to both surfaces at 20 mg./in.$^2$). | 4.53 | Bonded wet (both sides) | 1.7 |

EXAMPLE 12

The cyclohexane polymer solutions were applied to the surfaces of steel strips with a No. 60 Meyer bar. Both substrates to be joined were coated. The solution was evaporated and the strips were put into an oven until the polymer coatings had melted, whereupon the strips were brought into contact. The samples were cooled under 0.25 p.s.i. pressure and tested after 24 hours. The results are shown below.

| Polymer: | Bond strength (lbs.) |
|---|---|
| A | 8 |
| B | 9 |
| C | 75 |
| D | 156–200 (repeated) |
| E | 10 |

EXAMPLE 13

A portion of polymer F was blended with an equal weight of Staybelite ester 10, the glycerol ester of hydrogenated rosin. The blend was applied to a cellophane substrate. The surface tack was determined, using a Dunlop tackmeter, to be 528 g.

The same blend, applied to aluminum foil and tested according to ASTM D903–49, showed a peel strength of 130 g./in.

I claim:

1. An adhesive composition comprising an organic solvent containing dispersed therein a copolymer of at least three different alpha olefins each having between about 11 and about 20 carbon atoms and at least one other alpha olefin having between about 4 and about 10 carbon atoms in the molecule, at least about 5% by weight of the copolymer consisting of olefins having at least about 11 carbon atoms, said copolymer having an intrinsic viscosity, in cyclohexane at 25° C., of from about 0.1 to about 10 dl./g.

2. The composition claimed in claim 1 wherein the copolymer comprises n-butene and three or more different alpha olefins each having form 11 to 18 carbon atoms.

3. A pressure sensitive adhesive composition comprising (1) a copolymer of at least three different alpha olefins each having between about 11 and about 20 carbon atoms and at least one other alpha olefin having between about 4 and about 10 carbon atoms in the molecule, at least about 5% by weight of the copolymer consisting of olefins having at least about 11 carbon atoms, said copolymer having an intrinsic viscosity in cyclohexane at 25° C. of from about 0.1 to about 10 dl./g., and (2) a tackifying resin.

4. A laminated product comprising a first substrate bonded to a second substrate by means of an intermediate layer comprising a copolymer of at least three different alpha olefins each having between about 11 and about 20 carbon atoms and at least one other alpha olefin having between about 4 and about 10 carbon atoms in the molecule, at least about 5% by weight of the copolymer consisting of olefins having at least about 11 carbon atoms, said copolymer having an intrinsic viscosity in cyclohexane at 25° C. of from about 0.1 to about 10 dl./g.

5. The product claimed in claim 4 wherein at least one of the said substrates is cellulosic.

6. The product claimed in claim 5 wherein said one substrate is paper.

7. The product claimed in claim 4 wherein at least one of said substrates is glass.

8. The product claimed in claim 4 wherein at least one of the said substrates is metal.

References Cited

UNITED STATES PATENTS

| 2,825,721 | 3/1958 | Hogan et al. | 260—88.2 |
| 3,093,624 | 7/1963 | Gresham et al. | 260—88.2 |
| 3,278,504 | 10/1966 | Eells et al. | 260—88.2 |
| 3,305,507 | 2/1967 | White et al. | 260—80.78 |
| 3,352,742 | 11/1967 | Zunich et al. | 161—216 |
| 3,380,978 | 4/1968 | Ryan et al. | 260—88.2 |

OTHER REFERENCES

Simonds et al.: "Handbook of Plastics," 1949, TP986 A2548, pp. 619 to 622 relied on.

Harris, G.: "Encyclopedia of Chemical Technology," 1953, pp. 802 and 803.

DONALD E. CZAJA, Primary Examiner

W. E. PARKER, Assistant Examiner

U.S. Cl. X.R.

117—122, 124, 127, 143, 147, 155, 158; 161—213, 216, 219, 250; 260—33.6, 88.2